United States Patent
Mudulodu et al.

(10) Patent No.: US 11,632,733 B2
(45) Date of Patent: Apr. 18, 2023

(54) SYSTEM, APPARATUS AND METHOD FOR ACQUISITION OF SIGNALS IN WIRELESS SYSTEMS WITH ADVERSE OSCILLATOR VARIATIONS

(71) Applicant: Silicon Laboratories Inc., Austin, TX (US)

(72) Inventors: Sriram Mudulodu, Hyderabad (IN); Manoj Kumar Medam, Kadapa (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/472,935

(22) Filed: Sep. 13, 2021

(65) Prior Publication Data

US 2023/0077766 A1    Mar. 16, 2023

(51) Int. Cl.
*H04L 27/28* (2006.01)
*H04W 56/00* (2009.01)

(52) U.S. Cl.
CPC ................... *H04W 56/004* (2013.01)

(58) Field of Classification Search
CPC .................................................. H04W 56/004
See application file for complete search history.

(56) References Cited

U.S. PATENT DOCUMENTS

| | | |
|---|---|---|
| 6,011,625 A | 1/2000 | Glass |
| 7,676,210 B2 | 3/2010 | Paulus |
| 8,295,404 B1 | 10/2012 | Husted et al. |
| 8,437,415 B2 | 5/2013 | Mudulodu et al. |
| 8,531,216 B1 | 9/2013 | Wu et al. |
| 8,615,213 B2 | 12/2013 | de Ruijter et al. |
| 8,644,426 B1 * | 2/2014 | Zhou ............ H04B 1/1027 375/332 |
| 9,020,073 B2 | 4/2015 | van Waasen et al. |
| 9,720,875 B2 | 8/2017 | de Ruijter et al. |
| 10,061,740 B2 | 8/2018 | de Ruijter et al. |
| 10,172,105 B2 | 1/2019 | de Ruijter et al. |
| 10,827,451 B2 | 11/2020 | Mudulodu |
| 2002/0097820 A1 | 7/2002 | Simmons |
| 2004/0120412 A1 | 6/2004 | Banerjea |
| 2004/0203470 A1 | 10/2004 | Berliner et al. |
| 2005/0190098 A1 | 9/2005 | Bridgelall et al. |
| 2007/0110096 A1 | 5/2007 | Geile et al. |

(Continued)

OTHER PUBLICATIONS

Bluetooth, "High-Accuracy Distance Measurement," Nov. 11, 2020, Revision 7, 98 pages.

(Continued)

*Primary Examiner* — Jamal Javaid
(74) *Attorney, Agent, or Firm* — Zagorin Cave LLP (57) ABSTRACT

In one aspect, a radio device comprises: an analog front end (AFE) circuit to receive and process an incoming radio frequency (RF) signal comprising a packet; an analog-to-digital converter (ADC) coupled to the AFE circuit to receive and digitize the processed incoming RF signal into a digital signal; a detector coupled to the ADC to detect a carrier frequency offset (CFO) in the digital signal based at least in part on a preamble of the packet; and a controller coupled to the detector. The controller may generate a compensation value for the CFO based on the detected CFO and cause one or more components of the radio device to compensate for the CFO using the compensation value.

20 Claims, 5 Drawing Sheets

(56) References Cited

U.S. PATENT DOCUMENTS

| | | | |
|---|---|---|---|
| 2007/0155341 A1* | 7/2007 | Haiut | H03L 1/026 |
| | | | 455/75 |
| 2009/0122319 A1 | 5/2009 | Ronnekleiv et al. | |
| 2010/0020909 A1 | 1/2010 | Jung et al. | |
| 2010/0109903 A1 | 5/2010 | Carrick | |
| 2011/0129048 A1 | 6/2011 | Barbe et al. | |
| 2012/0288040 A1 | 11/2012 | Yi | |
| 2013/0080817 A1 | 3/2013 | Mihelic | |
| 2013/0241774 A1 | 9/2013 | Shin et al. | |
| 2013/0259049 A1 | 10/2013 | Mizrahi | |
| 2013/0272322 A1 | 10/2013 | Sagarwala et al. | |
| 2014/0254723 A1 | 9/2014 | Nazarathy et al. | |
| 2015/0098714 A1 | 4/2015 | Hatae et al. | |
| 2015/0110231 A1 | 4/2015 | Alexander et al. | |
| 2015/0280841 A1 | 10/2015 | Gudovskiy et al. | |
| 2015/0346332 A1 | 12/2015 | Taylor, Jr. | |
| 2016/0308633 A1 | 10/2016 | Liu et al. | |
| 2019/0081834 A1 | 3/2019 | de Ruijter et al. | |
| 2019/0306821 A1 | 10/2019 | Hu et al. | |
| 2019/0332137 A1 | 10/2019 | Benjamin et al. | |
| 2020/0166631 A1 | 5/2020 | Tong | |
| 2020/0292665 A1 | 9/2020 | Behrens et al. | |
| 2021/0058181 A1 | 2/2021 | Dwivedi et al. | |
| 2021/0075557 A1 | 3/2021 | Mudulodu et al. | |

OTHER PUBLICATIONS

Bluetooth, "High-Accuracy Distance Measurement," Dec. 16, 2019, Revision 11, 79 pages.

Bluetooth, "Supplement to the Bluetooth Core Specification," Dec. 31, 19, Revision 9, 37 pages.

Huang, B., et al., "A Robust Indoor Positioning Method Based on Bluetooth Low Energy with Separate Channel Information," Sensors, Aug. 9, 2019, 19 pages.

Zand, P., and Pasveer, W.F., A High-Accuracy Phase-Based Ranging Solution with Bluetooth Low Energy (BLE), Apr. 25, 2019, 9 pages.

* cited by examiner

SYSTEM, APPARATUS AND METHOD FOR ACQUISITION OF SIGNALS IN WIRELESS SYSTEMS WITH ADVERSE OSCILLATOR VARIATIONS

BACKGROUND

In wireless systems, incoming radio frequency (RF) signals are received and processed to recover message information such as data, audio, video or so forth. Many different operations are performed at RF frequencies and lower frequencies, including at baseband.

Careful adherence to accurate frequency of operation is needed to properly acquire and process incoming RF signals. There can be a variety of factors, including environmental conditions such as operating at high temperatures, that may lead to problems related to acquisition of RF signals in wireless systems. As an example, high temperatures can cause a variance in a local oscillator of a wireless device that may affect acquisition of signals/packets.

SUMMARY OF THE INVENTION

In one aspect, a radio device comprises: an analog front end (AFE) circuit to receive and process an incoming radio frequency (RF) signal comprising a packet; an analog-to-digital converter (ADC) coupled to the AFE circuit to receive and digitize the processed incoming RF signal into a digital signal; a detector coupled to the ADC to detect a carrier frequency offset (CFO) in the digital signal based at least in part on a preamble of the packet; and a controller coupled to the detector, wherein the controller is to generate a compensation value for the CFO based on the detected CFO and cause one or more components of the radio device to compensate for the CFO using the compensation value.

In an example, the radio device further comprises an external crystal oscillator to provide an oscillation signal to a frequency generator. The frequency generator may be coupled to the external crystal oscillator to receive the oscillation signal and generate one or mixing signals therefrom. The controller may send the compensation value to one or more of the external crystal oscillator and the frequency generator to cause the CFO compensation to occur. The controller may send the compensation value to the external crystal oscillator when the detected CFO exceeds a threshold value, and not send the compensation value to the external crystal oscillator when the detected CFO is less than the threshold value.

In an example, the controller is to generate a second compensation value when a first packet is not acquired, the second compensation value to compensate for a hypothetical CFO in the second packet. The controller may generate a plurality of test compensation values, each of the plurality of test compensation values for a hypothetical CFO. The radio device may further include a plurality of correlators each to perform a correlation on the second packet using one of the plurality of test compensation values, and the controller may select one of the plurality of test compensation values for use as the compensation value for a third packet. The radio device may further comprise one or more filters, where the one or more filters are to operate at a wider bandwidth when the plurality of correlators are used.

In another aspect, a method comprises: receiving, in a receiver, a RF signal of a first packet; processing, in the receiver, the RF signal into a baseband signal; obtaining a preamble of the first packet from the baseband signal; determining a CFO based at least in part on the first packet; and controlling one or more devices to compensate for the CFO to receive a second packet.

In an example, controlling the one or more devices comprises sending a compensation signal to an oscillator to cause the oscillator to adjust a frequency of operation. Controlling the one or more devices may further comprise sending a second compensation signal to a frequency generator of the receiver to cause the frequency generator to adjust a frequency of a mixing signal provided to a transmitter, the transmitter included in a transceiver with the receiver.

In an example, determining the CFO comprises: extracting a first portion of the preamble; measuring the CFO based on the first portion; and generating a compensation value based on the CFO. Controlling the one or more devices may include sending the compensation value to at least one of a frequency generator of the receiver and an oscillator.

In an example, the method further comprises: in response to determining that the first packet is not acquired, generating at least one test compensation value to compensate for a hypothetical CFO in the second packet; controlling the one or more devices using the at least one test compensation value to compensate for the hypothetical CFO; and thereafter in response to acquiring the second packet using the at least one test compensation value, further using the at least one test compensation value to control the one or more devices to compensate for the CFO.

In an example, the method further comprises: generating a plurality of correlation values, each of the plurality of correlation values generated using one of a plurality of message contents obtained using one of a plurality of test compensation values; selecting one of the plurality of test compensation values based at least in part on the plurality of correlation values; and using the selected test compensation value to control the one or more devices to compensate for the CFO.

In yet another aspect, a system comprises: a crystal oscillator to generate a clock signal at an oscillation frequency; and a receiver coupled to the crystal oscillator. The receiver comprises: an AFE circuit to receive and process an incoming RF signal comprising a packet; a digitizer coupled to the AFE circuit to convert the processed incoming RF signal into a digital signal; a detector coupled to the digitizer to detect a CFO in the digital signal due to variation in the oscillation frequency, where the detector is to detect the CFO based at least in part on one or more fields in a preamble of the packet; and a compensation circuit coupled to the detector to compensate for the CFO in the digital signal.

In an example, the compensation circuit comprises one or more of: a numerically controlled oscillator (NCO) to provide a frequency offset that is opposite to the CFO; and a sample control circuit to compensate a timing offset based at least in part on the CFO. The system may further include a transmitter, where the controller is to control the transmitter to compensate for the CFO during a communication with an access point, where the access point comprises a second transmitter to transmit the incoming RF signal comprising the packet. The controller may determine a compensation value for the CFO based on the detected CFO and send the compensation value to the crystal oscillator to cause the crystal oscillator to adjust the oscillation frequency of the clock signal.

DETAILED DESCRIPTION

In various embodiments, a control system may determine a carrier frequency offset (CFO) for an incoming wireless communication using information included in a packet of the communication. While embodiments herein are directed to carrier frequency offset detection and compensation relating to variations in oscillator signals (and resulting device-generated clock signals), understand that the techniques herein are usable for a variety of different causes of carrier frequency offsets such as other factors which can affect PPM of the crystal.

Furthermore while embodiments herein are discussed in connection with packet-based wireless communications, other embodiments may be used in different wireless schemes. And while particular embodiments may be used in connection with wireless local area networks (WLANs) such as in accordance with a given IEEE 802.11 standard, other embodiments may be used for wireless wide area networks or other wireless communication protocols.

In typical wireless communication systems, communication is in the form of bursts of packets where each such packet typically includes a preamble, a header, and a payload (amid potentially other information). The preamble of the packet is used by the receiver for the purposes of packet detection, measurement of carrier frequency offset, measurement of timing offset, and so forth. For example, in a WLAN—Orthogonal Frequency Division Multiplexing (WLAN-OFDM) system, the preamble portion of the packet includes a Legacy—Short Training Field (L-STF also called Short Preamble) and a Legacy—Long Training Field (L-LTF also called Long Preamble). By using a L-STF, a coarse CFO estimate can be obtained and by using a L-LTF, a fine CFO estimate may be obtained. As such this preamble information can be used for the purpose of the estimation of carrier frequency offset (also may be used for other purposes like channel estimation, etc.).

Figure 1:
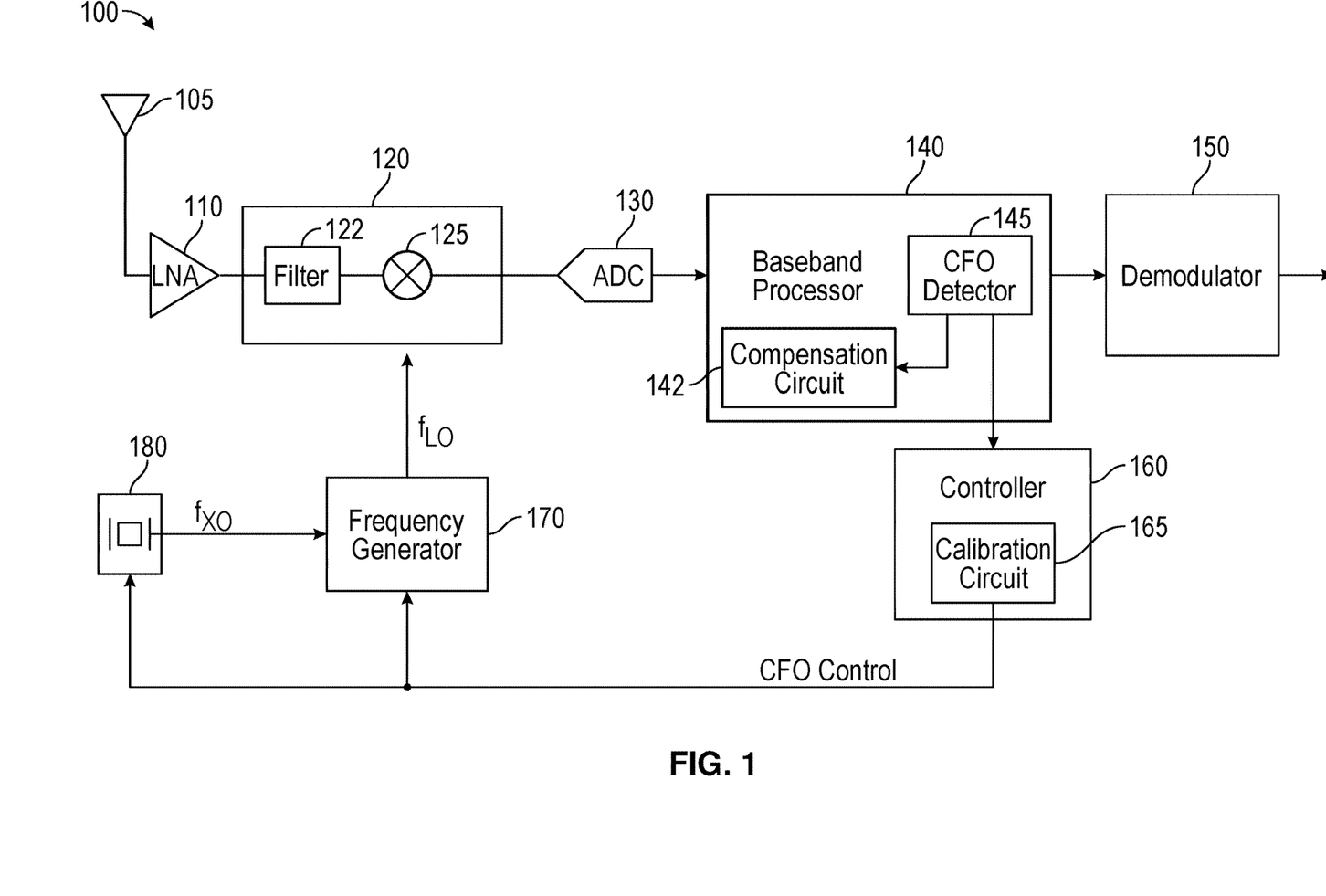
FIG. 1 is a block diagram of a receiver in accordance with an embodiment.

Referring now to FIG. 1, shown is a block diagram of a receiver in accordance with an embodiment. As shown in FIG. 1, receiver 100 may be implemented, in some cases, as a single semiconductor die receiver as included within an integrated circuit (IC). In such embodiments, all circuitry shown in FIG. 1 with the exception of an external antenna 105 and an external oscillator 180 (e.g., a crystal oscillator) may be implemented on the single semiconductor die.

In the embodiment shown, incoming radio frequency (RF) signals are received via antenna 105 and provided to a signal processing path including a low noise amplifier (LNA) 110. After appropriate amplification here, the incoming RF signals are provided to an analog front end (AFE) circuit 120. In various implementations, AFE circuit 120 may include various filtering, gain circuitry and so forth, including an analog filter 122. As will be described herein, in certain instances the bandwidth of this filter may be dynamically controlled in the presence of significant CFO. Further as shown, AFE circuit 120 includes a mixer 125 configured to downconvert an RF signal to a lower frequency signal, e.g., an intermediate frequency (IF) signal such as a low-IF signal, zero IF signal, or other lower frequency signal.

To this end, mixer 125, which in some cases may be a complex mixer, is configured to downconvert the incoming RF signals using a mixing signal having a mixing frequency, shown as mixing signal ($f_{LO}$) received from a frequency generator 170. As one example, frequency generator 170 may be a local oscillator (LO) that may be implemented as a phase locked loop (PLL). In embodiments herein, frequency generator 170 may generate the mixing signal using an incoming oscillator signal, $f_{xo}$, received from external oscillator 180. As described herein, there may be potentially significant temperature variation in oscillator 180, for which embodiments may be configured to compensate.

Still referring to the signal processing path of receiver 100, the downconverted signals output from AFE circuit 120 are provided to a digitizer, shown in FIG. 1 as an analog-to-digital converter (ADC) 130, which digitizes the signals. In turn, these digitized signals, which may be at baseband, are provided to a baseband processor 140. Although shown as a standalone baseband processor in the FIG. 1 embodiment, baseband processor 140 in some cases may be implemented within a digital signal processor (DSP).

After various baseband processing, including filtering, digital mixing, decimation and so forth, resulting baseband-processed signals may be provided to a demodulator 150 that demodulates these signals. In different implementations, one of a variety of demodulation schemes may be used. For purposes of discussion herein, assume that demodulator 150 is configured to perform orthogonal frequency division multiplexing (OFDM) demodulation. The resulting demodulated signals may be output from demodulator 150 and provided to further downstream processing circuitry, such as an audio processor (not shown for ease of illustration in FIG. 1).

To compensate for variations in oscillator frequency, baseband processor 140 may include a carrier frequency offset (CFO) detector 145. Although shown as being included within baseband processor 140, in other implementations CFO detector 145 may be a separate component. As will be described further herein, CFO detector 145 may be configured to detect, at baseband, CFO in received signals. Based at least in part on this detected CFO, a compensation circuit 142, also shown as being included in baseband processor 140, may compensate for the detected CFO in the current packet being processed (and following packets).

CFO detector 145 also may communicate any detected CFO to a controller 160. Although controller 160 is shown as a separate component in FIG. 1, it is possible in some implementations for this controller to be included within a baseband processor (or as part of a DSP in some implementations). In any event, controller 160 may include either dedicated or programmable hardware circuitry configured to control compensation of CFO, among other functions. To this end, controller 160 may include or be coupled to a non-volatile storage or other non-transitory storage medium to store instructions and data usable for performing CFO detection and compensation as described herein.

As further detailed in FIG. 1, controller 160 includes a calibration circuit 165. In embodiments herein, calibration circuit 165 may be configured to calibrate for CFO. Thus in response to CFO information received from CFO detector 145, calibration circuit 165 may determine one or more control values for use in controlling CFO. Calibration circuit 165 may communicate such CFO control information to one or more of frequency generator 170 and/or oscillator 180.

Based on this information, dynamic real time CFO compensation may occur, e.g., due to CFO caused by temperature variation of oscillator 180.

Furthermore, understand while in the embodiment of FIG. 1, only a receiver signal processing path is shown for ease of illustration, such receiver may be part of a wireless transceiver further including transmit capabilities. In such cases, carrier frequency offset compensation further may be performed for the transmit path, e.g., by way of appropriate control of a frequency generator (either frequency generator 170 or another such frequency generator) that provides a mixing signal used for upconverting transmission signals to an appropriate RF frequency. Understand that while shown at this high level in the embodiment of FIG. 1, many variations and alternatives are possible.

In embodiments, CFO/PPM variation introduced due to high temperature at a crystal (or other oscillator) can be measured using preamble information of a packet. The order of CFO that may be observed can be understood with the following examples. A parts per million (PPM) variation of '+50' from a nominal level at the crystal causes frequency offsets of 120 kilohertz (kHz) and 250 kHz in systems operating at frequencies of 2.4 gigahertz (GHz) and 5 GHz, respectively. Similarly, a PPM of '+200' at the crystal causes frequency offsets of 480 kHz and 1 megahertz (MHz) in systems operating at frequencies of 2.4 GHz and 5 GHz, respectively.

In a WLAN system, a receiver of a station can make use of a preamble of packets received from an access point (AP) to measure the CFO/PPM of the station. Note that a variety of different packets from the AP such as beacons (which are transmitted periodically (based on a delivery traffic indication message (DTIM)), packets transmitted to it, and/or packets transmitted to other stations, can be used to determine CFO. In a particular embodiment, received packets may be OFDM or direct sequence spread spectrum (DSSS) modulated packets.

It may be assumed that the temperature at the AP is not changing and remains the same. This implies that no CFO is observed at the AP, or the CFO remains the same for packets originating from the AP. Note that the CFO measured at the station based on preamble information may account for any CFO at the AP, if present. The measured CFO is still valid for compensation even if there is CFO at the AP, since this is the same AP with which the station communicates.

Different implementations may be used for various wireless systems that use protocols like WLAN-OFDM, WLAN-DSSS, and Bluetooth, as examples. In OFDM WLAN systems, the CFO that can be measured on L-STF information of a prefix is in the range +/−625 kHz, and from L-LTF information of a prefix is in the range +/−156.25 kHz. So the acquisition range is +/−625 kHz. In systems where integer frequency offset estimation/correction is used, the acquisition range may be higher. Since a baseband clock signal is derived from the LO, the CFO and timing offsets in OFDM systems are in locked mode.

In DSSS WLAN systems, the CFO can be measured on a SYNC field of a preamble. CFO and timing offsets are not in locked mode as in OFDM systems and can be resolved using the corresponding sampling clock. In an embodiment where the wireless communication system is Bluetooth Low Energy, a master broadcasts packets when it is in advertising mode before establishing a connection with the slave. In a Bluetooth system, the master device and slave device act as AP and station respectively, when compared to a WLAN system. In a Bluetooth system, namely a Bluetooth Low Energy (BLE) system, a packet structure includes a preamble, access address and payload. In an embodiment, CFO and timing offsets may be measured on the access address of the packet. Note that frequency tracking and time tracking algorithms may also be operative on the entire portion of the packet, as a frequency offset measured at the start of the packet is used for compensation on the remaining portion of the packet. Frequency tracking and timing tracking algorithms may be used in systems having varying frequency offset (during the portion of the packet). Note that in a WLAN-OFDM case, the training fields (L-STF, L-LTF) are provided with repetitive portions. The phase offset between the repetitive portions in the presence of CFO is used to measure/estimate the CFO. In another example where the protocol of communication is Bluetooth and GFSK modulation is used, the fixed phase offset observed in the angle domain (or phase domain) can be used to measure the CFO.

Figure 2:
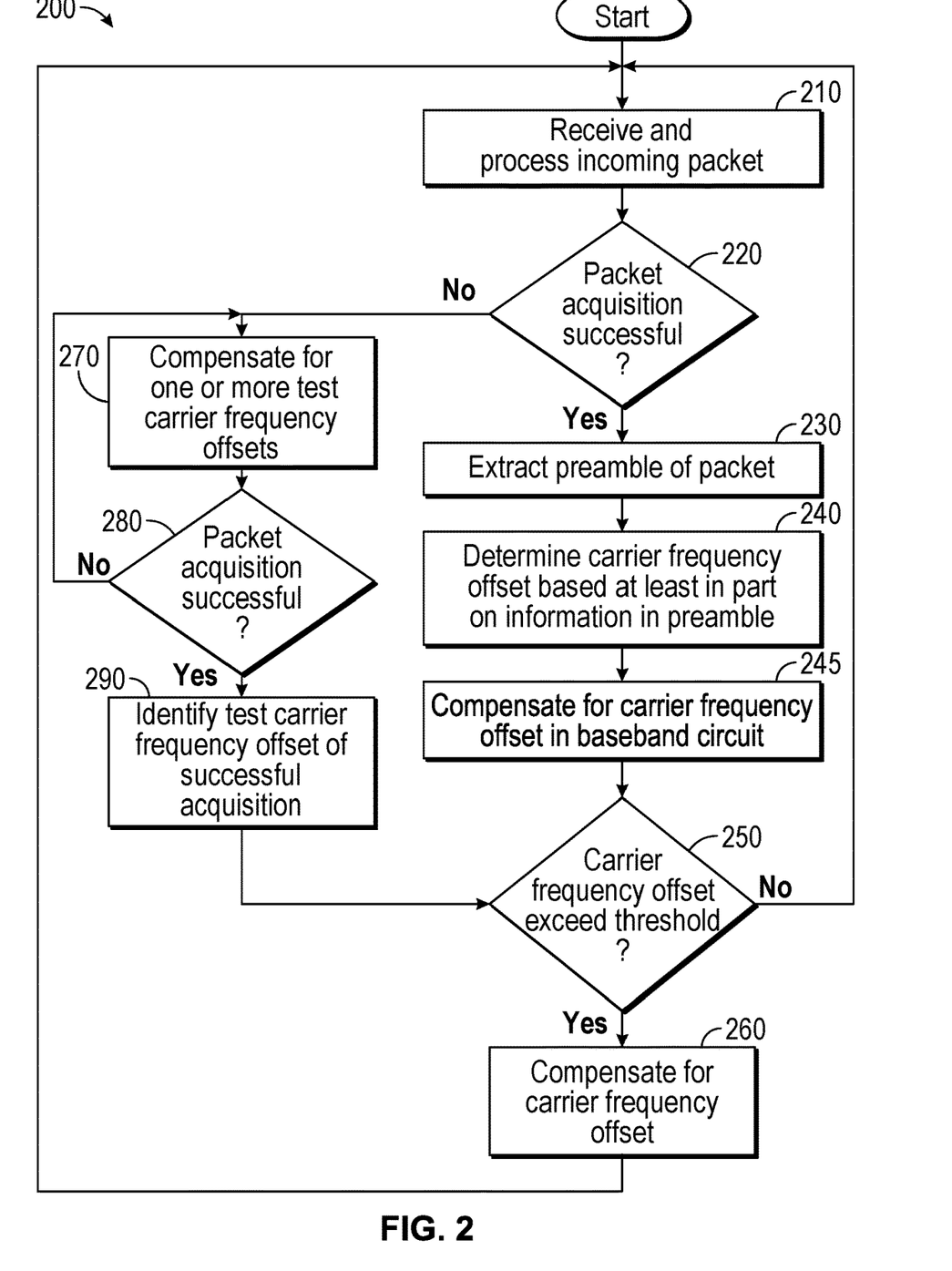
FIG. 2 is a flow diagram of a method in accordance with an embodiment.

Referring now to FIG. 2, shown is a flow diagram of a method in accordance with an embodiment. As shown in FIG. 2, method 200 is a method for compensating for carrier frequency offset. As such, method 200 may be performed by control circuitry, such as a CFO detector and a CFO calibration circuit as described above with regard to FIG. 1. As such, method 200 may be performed by hardware circuitry, firmware, software, and/or combinations thereof.

As illustrated, method 200 begins by receiving and processing an incoming packet (block 210). Although embodiments are not limited in this regard, assume that the incoming packet (or frame, more generally) is communicated within a given RF signal and received in a receiver according to an OFDM modulation scheme and includes a preamble, a header, and a data payload. This packet processing may be performed in a signal processing path such as shown in FIG. 1, to receive and process an incoming RF signal, downconvert the processed RF signal, digitize the downconverted signal, and then provide the digitized signal to a baseband processor. In turn, the CFO detection and compensation may be performed at least in part at baseband.

Continuing with method 200, next it may be determined whether the packet is able to be acquired (diamond 220). Such acquisition may be performed using well-known techniques to acquire a signal using predetermined information present in a preamble of the packet. Here, the acquisition of the frame may be treated as successful, only if a cyclic redundancy checksum (CRC) check on decoded data results in a CRC pass. The acquisition process may include various steps starting from receiving and processing the frame to checking the integrity of the decoded data using the CRC check. If acquisition is successful, the control path is to block 230. At block 230 the packet preamble may be extracted. Then at block 240 a carrier frequency offset may be determined based at least in part on certain information present in the preamble. Such determination of CFO may be performed in a CFO detector and may be based on comparison of received preamble information to expected information, e.g., a predetermined prefix pattern included in a preamble of an OFDM packet.

As one example, CFO computation may be done as follows: in the case of L-STF, 10 repetitions are present with total of 160 samples over a duration of 8 microseconds (usec) (with a sampling rate of 20 MHz). Each repetition has 16 samples, implying that $\{x(n), x(n-16)\}$, $\{x(n-1), x(n-17)\}$, ... $\{x(n-15), x(n-31)\}$ samples are the same when considering a set of 32 samples. At the receiver in the presence of frequency offset, if y(n) is received as x(n), then y(n−16) will be received as $x(n)\exp(j*2*pi*(fc/fs)*16)$. The phase shift computed between sample y(n) and y(n−16)

gives the CFO (fc is the only unknown term which is CFO and fs is sampling rate which is 20 MHz).

Still with reference to FIG. 2, the OFDM packet may be compensated within the baseband circuit for the determined CFO at block 245. Next it may be determined at diamond 250 whether a carrier frequency offset thus determined exceeds a threshold. As an example, a threshold may be set at a particular value of parts per million (PPM), e.g., between approximately +100 PPM and −100 PPM. If it is determined that this carrier frequency offset does not exceed the threshold level, no further operations occur with regard to carrier frequency offset compensation for the current packet and control passes back to block 210 for a next received packet. Thus, as shown in FIG. 2, CFO estimation and correction will occur for every packet. Tuning/Calibrating the crystal using the estimated CFO of the current packet to receive the next packet will be done based on comparison with the threshold.

Otherwise, if it is determined that the CFO exceeds a threshold, control passes to block 260 where carrier frequency offset compensation may be performed, e.g., in a compensation circuit such as shown in FIG. 1. Different compensation techniques may be performed, depending upon implementation. Once an CFO/PPM is determined at the station, the effect of crystal oscillator error can be compensated in one or more manners. In one embodiment, the crystal oscillator itself can be re-calibrated, by providing a set of programming values with a resolution to enable tuning In another embodiment, CFO compensation may be performed by artificially introducing clock and frequency offsets in a signal to be transmitted from a station (before transmission), such that no CFO is observed on the final transmitted signal. Similarly, at the receiver, PPM of the crystal may be compensated by artificially introducing the clock and frequency offsets in the baseband such that further blocks of the baseband do not observe the effect of PPM of the crystal.

In one embodiment, CFO compensation may be done at receiver in baseband using a Numerically Controlled Oscillator (NCO), which can correct a negative frequency offset or positive frequency offset. Timing offset compensation may be done at the receiver in baseband by skipping/stuffing of a sample (in combination with fractional delay filters).

After processing the first frame from the AP, the station knows the PPM of its crystal. The PPM of the crystal introduces frequency and timing offset to the signal. The station, for receiving a second packet, may operate dedicated circuitry on the second packet from the start of the second packet such that the introduced frequency and timing offsets are not observed on the frame when provided to the rest of the blocks of the receiver. The dedicated circuitry here may contain an NCO to compensate for the CFO introduced and skip/stuff logic (in combination with fractional delay filters) to compensate for the timing offset. If the PPM of the crystal results in the introduction of positive frequency offset, the NCO at the dedicated circuitry may operate to provide a negative frequency offset and vice-versa. If the PPM of the crystal results in additional samples due to increase in sampling clock frequency, the skip logic (in combination with fractional delay filters) of the dedicated circuitry may operate and vice-versa. In an embodiment, the dedicated circuitry may be assumed to be present after the ADC at the receiver and before DAC at the transmitter The station, for transmitting a packet after processing a first packet from the AP, may operate a dedicated circuitry on the transmit sample of the frame such that the frequency and timing offsets that is introduced due to the PPM of the crystal are pre-compensated. The blocks and operation of the dedicated circuitry may be similar to that explained above for receiver.

Note in implementations in which an IoT or other wireless device is often in a sleep mode, the station may be configured to wake up periodically for measurement and correction of PPM (calibration) to always remain within the acquisition range.

In some cases a receiver may not successfully acquire a packet due to CFO (alone or in association with other impairments). Embodiments may still be able to determine a CFO even where a station is outside an acquisition range.

In one embodiment, a test or hypothetical carrier frequency offset (e.g., in terms of hypothetical PPM per unit of time) may be selected. Once the station is not able to acquire packets over a certain period, then a predetermined compensation value (e.g., a PPM value) is selected and compensated on the next receiving packet. If packet acquisition remains unsuccessful, another compensation value can be selected (e.g., from a set of predetermined PPM values), until the acquisition of the packet occurs. The crystal oscillator frequency may be tuned based on the predetermined compensation value to compensate on the next receiving packet. The processing continues for further packets using each of the predetermined compensation values from the set until acquisition occurs.

In another embodiment, multiple test or hypothetical carrier frequency offsets can be used concurrently. In this case, once the station is not able to acquire packets over a certain period, a plurality of correlators, each corresponding to a compensation value (e.g., a PPM hypothesis) can be used. Note that these correlators may be implemented as a set of parallel correlators, each configured to receive an incoming digital signal that is shifted in frequency with respect to the other correlators. After correlation, the hypothesis that gives a highest correlation may be selected as the determined CFO for the receiver, and thus may be used for performing CFO compensation. To aid in this process, wider band analog and baseband filters may be used. In an embodiment, where a plurality of correlators each with a PPM hypothesis and where the bandwidth of operation of a WLAN system is 20 MHz, the wider band filters may assumed to have 10% higher bandwidth (e.g., +/−11 MHz instead of +/−10 MHz)] to avoid the cutting off the edge frequency components from the signal. The filter bandwidth of the wider band analog and baseband filter may be selected such that the adjacent channel interference performance is within the required limit. The additional filter bandwidth (+/−1 MHz in above example) determines the CFO acquisition range and +/−1 MHz correspond to +/−200 PPM of a system operating in 5 GHz WLAN channels. With embodiments such as described above, signal acquisition may be achieved over a wider range of PPM/CFO. For example, embodiments may be used to acquire signals where a crystal PPM error of up to approximately +/−250 PPM occurs. Once the acquisition is done and a PPM hypothesis is determined, then the filter bandwidth may be reduced to the optimum instead of a wider bandwidth.

One example of such hypothetical CFO compensation is further illustrated in FIG. 2. Specifically if it is determined at diamond 220 that signal acquisition is not successful (e.g., due to carrier frequency offset), a different technique may be used to identify the carrier frequency offset. Here at block 270 carrier frequency offset compensation may be performed for one or more test carrier frequency offsets. For example, a given carrier frequency offset may be assumed as this test carrier frequency offset (note this test carrier frequency offset also may be termed a "hypothetical carrier frequency offset").

After performing such compensation, it is next determined at diamond 280 if packet acquisition is successful. If so, control passes to block 290 where the test carrier frequency offset that was used for successful acquisition may be identified. Thereafter control passes to diamond 250 discussed above, to determine whether this identified carrier frequency exceeds the relevant threshold. Instead if it is determined at diamond 280 that packet acquisition still is not successful at one or more test carrier frequency offsets, control passes back to block 270, where another hypothetical carrier frequency offset can be used. Note that after some number of unsuccessful attempts to acquire a signal using these test carrier frequency offsets, the method may conclude. Understand while shown with this particular implementation in FIG. 2, many variations and alternatives are possible.

Figure 3:
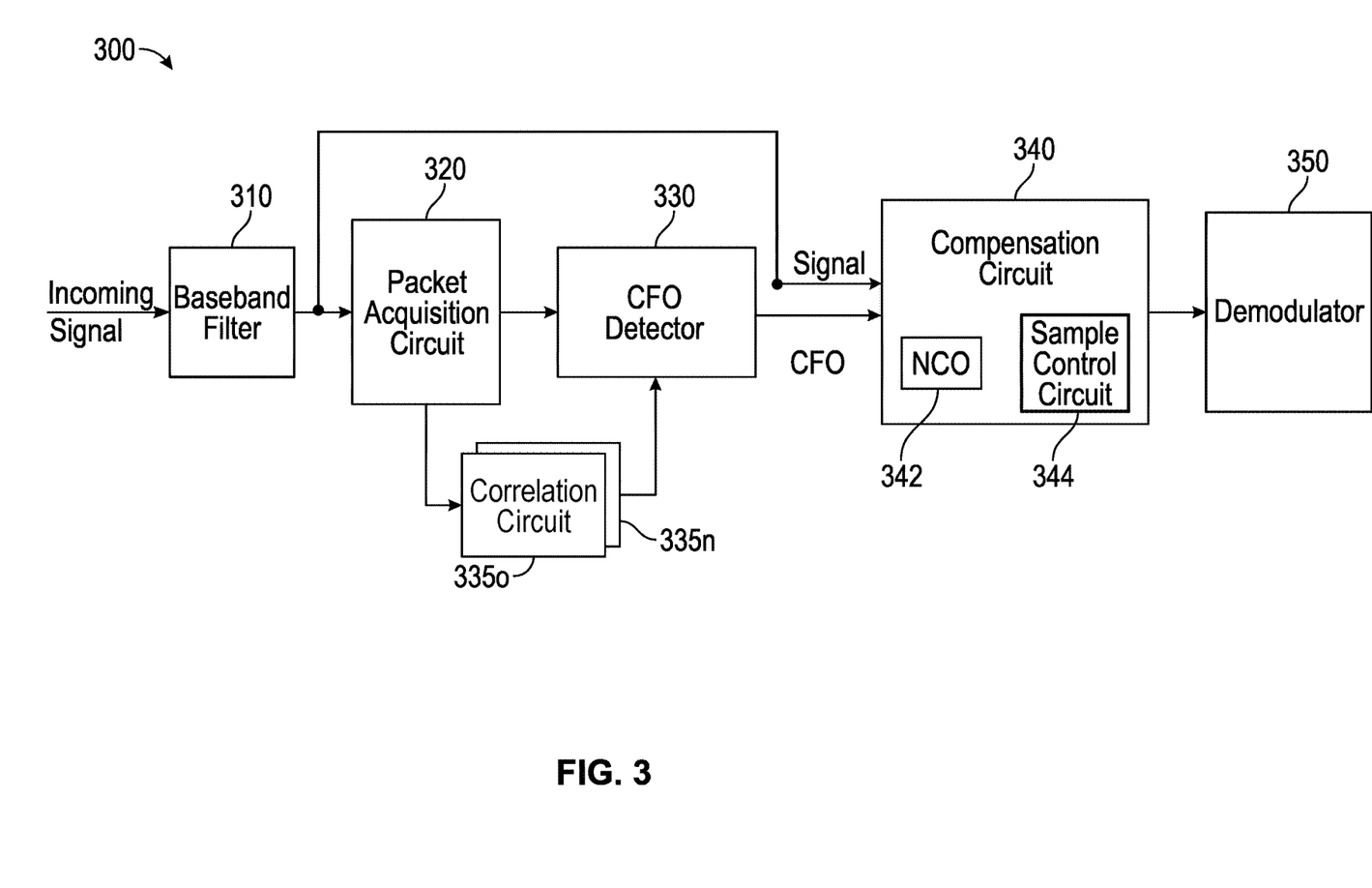
FIG. 3 is a block diagram of a portion of a baseband processor in accordance with an embodiment.

Referring now to FIG. 3, shown is a block diagram of a portion of a baseband processor in accordance with an embodiment. More specifically, baseband processor 300 in FIG. 3 is shown at a level of detail to identify the components involved in performing CFO compensation on incoming packets during baseband processing. As an example, baseband processor 300 may be included in a receiver such as receiver 100 in FIG. 1 as baseband processor 140.

As illustrated, incoming baseband signals are received in a baseband filter 310, where they are filtered and then provided to a packet acquisition circuit 320. Packet acquisition circuit 320 may be configured to acquire incoming packets, e.g., based on preamble information. In an embodiment, packet acquisition circuit 320 may be configured to analyze information in the preamble of a packet to determine CFO, such as discussed above. When acquisition is unsuccessful, acquisition may be attempted using multiple parallel correlation circuits $335_0\text{-}335_n$, as described above. In another embodiment, when acquisition is unsuccessful, the acquisition is attempted on further packets with each hypothetical CFO from the set, until acquisition is successful.

Still with reference to FIG. 3, a CFO detector 330 is present and coupled to both packet acquisition circuit 320 and correlation circuits 335 such that it can determine a level of CFO. As such, CFO detector 330 may output signal information and a measure of CFO, which it provides to a compensation circuit 340.

In embodiments herein, compensation circuit 340 may be configured to compensate for the detected level of CFO. In different situations, one or more of an NCO 342 and a sample control circuit 344 may be used to compensate for the detected CFO. As described above, NCO 342 may provide a controllable level of frequency offset based on the CFO. If a variation in PPM of a crystal results in sample variations due to variations in sampling clock frequency, sample control circuit 344 may skip or stuff samples (in combination with fractional delay filters).

Note that NCO 342 (or instead a direct digital synthesizer (DDS) when present) may take a frequency of the waveform (e.g., sine and cosine) as an input and generate a waveform for the frequency. Here, NCO 342 may include a lookup table and a digital accumulator to generate an address in the range of the lookup table size. A series of samples selected from the lookup table based on the address may constitute the waveform and can be used to mix with the signal to be frequency corrected. NCO 342 may be configured to perform frequency offset compensation in this manner. In turn, sample control circuit 344 may be configured to perform timing offset correction, e.g., by using one or more fractional delay filters, such as a farrow interpolator.

In any event, the resulting packet information is provided to a demodulator 350 for demodulation. Note that demodulator 350 may be a separate component from the baseband processor, such as shown in FIG. 1 above. In another embodiment, demodulator 350 may be a part of the baseband processor. Note further that one or more of CFO detector 330 and compensation circuit 340 also may control various components based on whether signal acquisition is successful and/or a level of CFO detected. For example, a bandwidth of baseband filter 310 (as well as analog filters not shown in FIG. 3) may be controlled as discussed above. Understand while shown at this high level in the embodiment of FIG. 3, many variations and alternatives are possible.

As one real world example, a light bulb wireless system may work in adverse conditions, where communication itself may be very sparse and only occur periodically. The light bulb may be a smart bulb, implemented with one or more light emitting diodes or other light sources and including at least one semiconductor die that includes various control and communication circuitry, including the CFO detection and compensation circuitry described herein.

The operating temperature of this system can be high, and the temperature may not be the same between wake-up states. A change in temperature at the light bulb (station) causes a change in the PPM of the crystal present at the light bulb, which in turn results in a shift of LO center frequency and baseband/AFE clocks derived from it. These changes in turn introduce frequency offset and timing offset impairments, respectively, as seen in baseband processing, affecting both transmission and reception. A high offset or difference in CFO can prevent the packets from being received properly. With embodiments, CFO can be detected and compensated to enable acquisition of signals in adverse conditions such as high temperatures.

Figure 4:
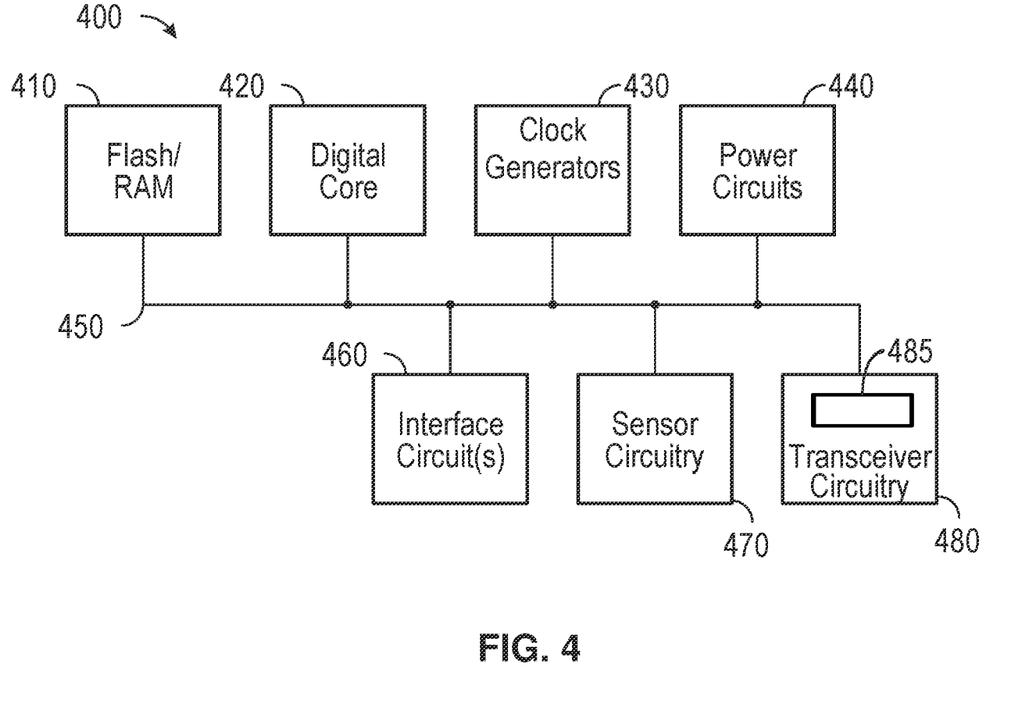
FIG. 4 is a block diagram of a representative integrated circuit that incorporates and embodiment.

Referring now to FIG. 4, shown is a block diagram of a representative integrated circuit 400 that includes CFO detection and compensation circuitry as described herein. In the embodiment shown in FIG. 4, integrated circuit 400 may be, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 400 includes a memory system 410 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for determining CFO and compensating for the same, as described herein.

Memory system 410 couples via a bus 450 to a digital core 420, which may include one or more cores and/or microcontrollers that act as a main processing unit of the integrated circuit. In turn, digital core 420 may couple to clock generators 430 which may provide one or more phase locked loops or other clock generator circuitry to generate various clocks for use by circuitry of the IC.

As further illustrated, IC 400 further includes power circuitry 440, which may include one or more voltage regulators. Additional circuitry may optionally be present depending on particular implementation to provide various functionality and interaction with external devices. Such circuitry may include interface circuitry 460 which may provide interface with various off-chip devices, sensor circuitry 470 which may include various on-chip sensors including digital and analog sensors to sense desired signals, such as for a metering application or so forth.

In addition as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 480 includes a baseband circuit 485 that can perform CFO detection and correction as described herein. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 5:
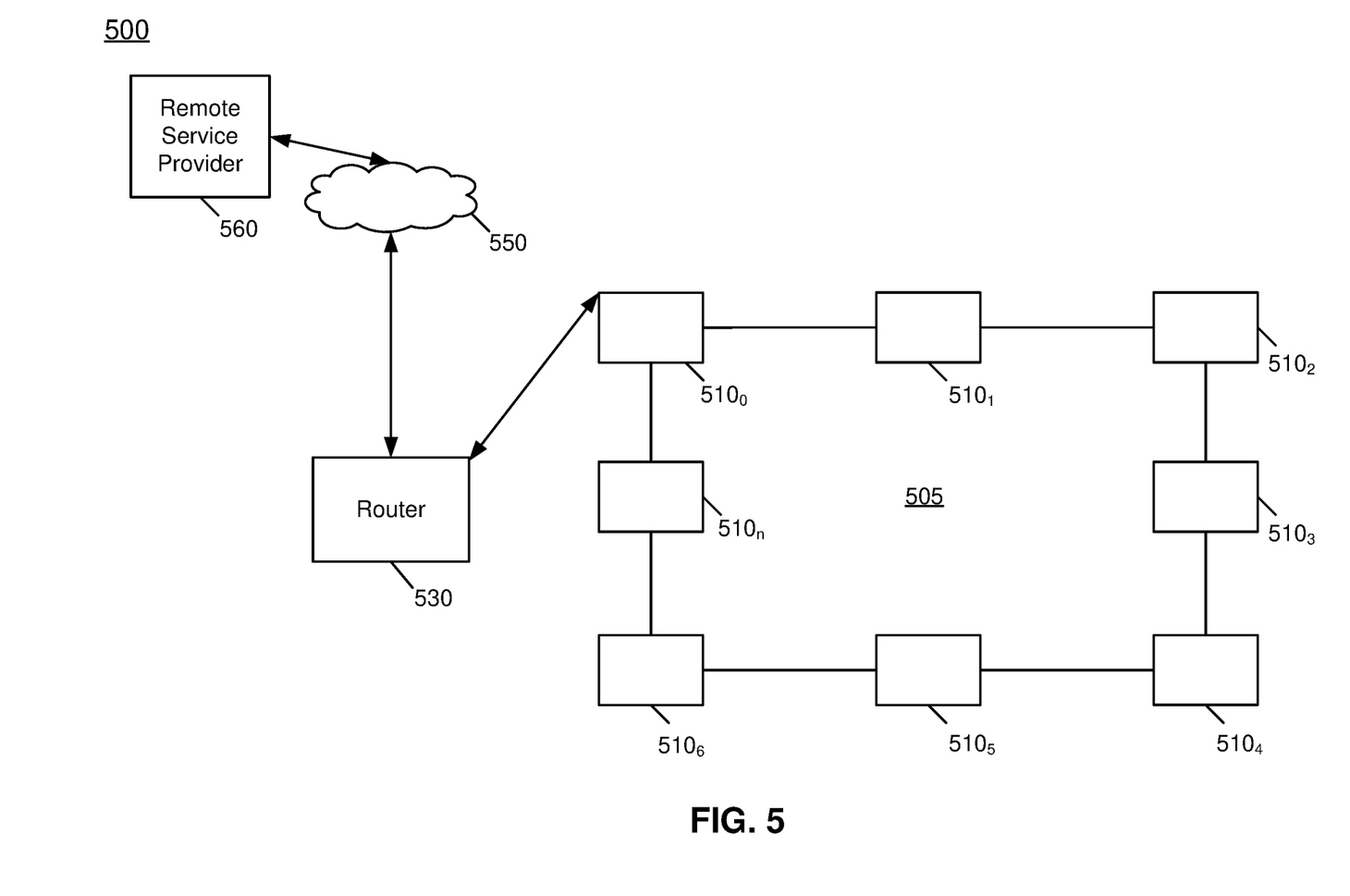
FIG. 5 is a high level diagram of a network in accordance with an embodiment.

Referring now to FIG. 5, shown is a high level diagram of a network in accordance with an embodiment. As shown in FIG. 5, a network 500 includes a variety of devices, including smart devices such as IoT devices, routers and remote service providers. In the embodiment of FIG. 5, a mesh network 505 may be present, e.g., in a building having multiple IoT devices $510_{0-n}$. Such IoT devices may perform CFO detection and correction as described herein. As shown, at least one IoT device 510 couples to a router 530 that in turn communicates with a remote service provider 560 via a wide area network 550, e.g., the internet. In an embodiment, remote service provider 560 may be a backend server of a utility that handles communication with IoT devices 510. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A radio device comprising:
an analog front end (AFE) circuit to receive and process an incoming radio frequency (RF) signal comprising a packet;
an analog-to-digital converter (ADC) coupled to the AFE circuit to receive and digitize the processed incoming RF signal into a digital signal;
a detector coupled to the ADC to detect a carrier frequency offset (CFO) in the digital signal based at least in part on a preamble of the packet; and
a controller coupled to the detector, wherein the controller is to generate a compensation value for the CFO based on the detected CFO, and
wherein the controller is to send the compensation value to an oscillator to compensate for the CFO when the detected CFO exceeds a threshold value, and to not send the compensation value to the oscillator when the detected CFO is less than the threshold value.

2. A radio device comprising:
an analog front end (AFE) circuit to receive and process an incoming radio frequency (RF) signal comprising a packet;
an analog-to-digital converter (ADC) coupled to the AFE circuit to receive and digitize the processed incoming RF signal into a digital signal;
a detector coupled to the ADC to detect a carrier frequency offset (CFO) in the digital signal based at least in part on a preamble of the packet; and
a controller coupled to the detector, wherein the controller is to generate a compensation value for the CFO and cause one or more components of the radio device to compensate for the CFO using the compensation value, wherein the controller is to generate a second compensation value when a first packet is not acquired, the compensation value being generated using the second compensation value, the second compensation value to compensate for a hypothetical CFO in a second packet.

3. The radio device of claim 2, further comprising a frequency generator coupled to provide one or more mixing signals used by the AFE to process the incoming RF signal.

4. The radio device of claim 3, wherein the controller is to send the compensation value to one or more of an oscillator and the frequency generator to cause the CFO compensation to occur.

5. The radio device of claim 4, wherein the controller is to send the compensation value to the oscillator when the detected CFO exceeds a threshold value, and to not send the compensation value to the oscillator when the detected CFO is less than the threshold value.

6. The radio device of claim 2, further comprising:
an oscillator to provide an oscillation signal; and
a frequency generator configured to generate a mixing signal based on the oscillation signal and provide the mixing signal to the AFE for processing the incoming RF signal.

7. The radio device of claim 2, wherein the controller is to generate a plurality of test compensation values, each of the plurality of test compensation values for the hypothetical CFO, the controller selecting the second compensation value from the plurality of test compensation values.

8. The radio device of claim 2, further comprising a plurality of correlators each to perform a correlation on the second packet using a corresponding one of a plurality of test compensation values, and wherein the controller is to select one of the plurality of test compensation values for use as the second compensation value for a third packet based on outputs of the plurality of correlators.

9. The radio device of claim 8, further comprising one or more filters in the AFE to process the incoming RF signal, wherein the one or more filters are to operate at a wider bandwidth when the plurality of correlators are used.

10. A method comprising:
receiving, in a receiver, a radio frequency (RF) signal of a first packet;
processing, in the receiver, the RF signal into a baseband signal;
in response to determining that the first packet is not acquired from the baseband signal, generating at least one test compensation value to compensate for a hypothetical carrier frequency offset (CFO) in a second packet;
controlling one or more devices in the receiver using the at least one test compensation value to compensate for the hypothetical CFO; and thereafter in response to acquiring the second packet using the at least one test compensation value, further using the at least one test compensation value to control the one or more devices to compensate for a CFO in the baseband signal.

11. The method of claim 10, wherein controlling the one or more devices comprises sending a compensation signal based on the at least one test compensation value to an oscillator to cause the oscillator to adjust a frequency of operation of the receiver.

12. The method of claim 10, wherein controlling the one or more devices further comprises sending a compensation signal based on the at least one test compensation value to a frequency generator of the receiver to cause the frequency generator to adjust a frequency of a mixing signal provided to a transmitter, the transmitter included in a transceiver with the receiver.

13. The method of claim 10 further comprising:
determining the CFO comprising:
obtaining a preamble of a third packet from the baseband signal;
extracting a first portion of the preamble;
measuring the CFO based on the first portion; and
generating a compensation value of the receiver based on the CFO.

14. The method of claim 13, wherein controlling the one or more devices comprises sending the compensation value to a frequency generator of the receiver or an oscillator generating an oscillation signal used by the frequency generator.

15. The method of claim 10, further comprising:
generating a plurality of correlation values, each of the plurality of correlation values being generated using one of a plurality of message contents obtained using one of the at least one test compensation value; and
selecting one of the at least one test compensation value based at least in part on the plurality of correlation values.

16. A system comprising:
a receiver comprising:
an analog front end (AFE) circuit to receive and process an incoming radio frequency (RF) signal comprising a packet;
a digitizer coupled to the AFE circuit to convert the processed incoming RF signal into a digital signal;
a detector coupled to the digitizer to detect a carrier frequency offset (CFO) in the digital signal, wherein the detector is to detect the CFO based at least in part on one or more fields in a preamble of the packet; and
a compensation circuit coupled to the detector to compensate for the CFO in the digital signal, wherein the compensation circuit comprises a numerically controlled oscillator (NCO) to generate a signal corresponding to a frequency offset that is opposite to the CFO, the signal to be combined with the digital signal, or comprises a sample control circuit to compensate a timing offset of the digital signal based at least in part on the CFO.

17. The system of claim 16, further comprising:
a transmitter; and
a controller to control the transmitter to compensate for the CFO during a communication with an access point, wherein the access point comprises a second transmitter to transmit the incoming RF signal comprising the packet.

18. The system of claim 16, further comprising:
a controller to determine a compensation value for the CFO based on the detected CFO and send the compensation value to an oscillator to cause the oscillator to adjust an oscillation frequency of a clock signal used by the receiver.

19. The system of claim 16 further comprising:
an oscillator to generate a clock signal having an oscillation frequency; and
a frequency generator configured to generate a mixing signal from the clock signal, wherein the AFE uses the mixing signal to generate the processed incoming RF signal.

20. The system of claim 19 wherein the frequency generator or the oscillator are controlled based on the CFO.

* * * * *